United States Patent
SayyarRodsari et al.

(10) Patent No.: US 12,210,326 B2
(45) Date of Patent: Jan. 28, 2025

(54) AUTOMATED MONITORING AND CONTROL USING UPDATED STREAMING DECISION TREE

(71) Applicant: Rockwell Automation Technologies, Inc., Mayfield Heights, OH (US)

(72) Inventors: Bijan SayyarRodsari, Austin, TX (US); Jakob Methfessel, Muskego, CA (US); Kadir Liano, Pflugerville, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/419,161

(22) Filed: Jan. 22, 2024

(65) Prior Publication Data

US 2024/0160163 A1    May 16, 2024

Related U.S. Application Data

(63) Continuation of application No. 17/374,644, filed on Jul. 13, 2021, now Pat. No. 11,886,152.

(51) Int. Cl.
  *G05B 13/02*    (2006.01)
  *G05B 13/04*    (2006.01)
  *G06N 5/01*    (2023.01)

(52) U.S. Cl.
  CPC ......... *G05B 13/042* (2013.01); *G05B 13/028* (2013.01); *G05B 13/048* (2013.01); *G06N 5/01* (2023.01)

(58) Field of Classification Search
  None
  See application file for complete search history.

(56) References Cited

U.S. PATENT DOCUMENTS

| | | |
|---|---|---|
| 4,552,718 A | 11/1985 | Impink, Jr. et al. |
| 5,481,649 A | 1/1996 | Birdwell |
| (Continued) | | |

OTHER PUBLICATIONS

Ikkai et al. "Automatic regeneration of sequence programs for operating plants." IEEE Robotics & Automation Magazine 4.2 (1997): 20-26, published 1997.*

(Continued)

*Primary Examiner* — Bernard G Lindsay
(74) *Attorney, Agent, or Firm* — Fletcher Yoder, P.C.

(57) ABSTRACT

A non-transitory computer-readable medium comprising computer-executable instructions that, when executed, are configured to cause a processor to perform operations that include receiving process input data associated with one or more automation devices, determining a plurality of operating conditions corresponding to the one or more automation devices; clustering the process input data based on the plurality of operating conditions, receiving a decision tree representative of the plurality of operating conditions and corresponding process input data, determining a splitting criterion for one or more nodes of the decision tree based on the clustered process input data, wherein the splitting criterion is configured to link the process input data to at least two operating conditions based on the decision tree, generating control logic for the one or more automation devices based on the decision tree and splitting criterion, and sending the control logic to the one or more automation devices.

20 Claims, 6 Drawing Sheets

(56) References Cited

U.S. PATENT DOCUMENTS

| | | |
|---|---|---|
| 6,772,633 B2 | 8/2004 | Terry et al. |
| 9,321,543 B2 | 4/2016 | Randerath et al. |
| 2012/0181866 A1 | 7/2012 | Abert et al. |
| 2013/0179377 A1 | 7/2013 | Oberg et al. |
| 2014/0351196 A1* | 11/2014 | Hu .................... G06N 5/01 706/52 |
| 2016/0011618 A1 | 1/2016 | Janous et al. |
| 2018/0260719 A1 | 9/2018 | Nori et al. |
| 2019/0005396 A1 | 1/2019 | Krutsch et al. |
| 2019/0138938 A1 | 5/2019 | Vasseur et al. |
| 2021/0294747 A1 | 9/2021 | Li |
| 2023/0376790 A1* | 11/2023 | Hamada .................... G09C 1/00 |

OTHER PUBLICATIONS

Ben-Haim, Yael et al.; "A Streaming Parallel Decision Tree Algorithm"; http://www.jmlr.org/papers/volume11/ben-haim10a/ben-haim10a.pdf Journal of Machine Learning Research 11; (2010); pp. 849-872.

Glowacz, Adam; "Acoustic-Based Fault Diagnostics of Commutator Motor"; Electronics 2018 7(11); 299; https://doi.org/10.3390/electronics7110299.

Lyon, R.J. et al.; "Hellinger Distance Trees for Imbalanced Streams"; https://arxiv.org/pdf/1405.2278.pdf; Preprint submitted to 22nd International Conference on Pattern Recognition; Dec. 2013.

Yang, Ruo-Yu et al; "Machine auscultation: enabling machine diagnostics using convolutional neural networks and large-scale machine audio data"; Advances in Manufacturing; vol. 7; pp. 174-187; (May 2019).

Coltraco; "Acoustic Emissions & Acoustic Condition Monitoring"; https://coltraco.com/product-category/acoustic/; accessed Jul. 12, 2021.

* cited by examiner

AUTOMATED MONITORING AND CONTROL USING UPDATED STREAMING DECISION TREE

CROSS-REFERENCE TO RELATED APPLICATIONS

This application is a continuation of U.S. patent application Ser. No. 17/374,644, entitled "AUTOMATED MONITORING AND CONTROL USING AUGMENTED STREAMING DECISION TREE," filed Jul. 13, 2021, which is hereby incorporated by reference in its entirety for all purposes.

BACKGROUND

The present disclosure generally relates to control systems and, more particularly, to control systems using decision trees for monitoring, diagnostics, control, and optimization of processes.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also facilitate performing diagnostics on the process to determine cause of undesired operation.

In some instances, the control system may utilize a model predictive control (MPC) system to optimize performance of the process by generating and manipulating a process model to transition the process from a current operating state to a desired operating state over a control horizon (e.g., future time steps). At least in some instances, the control system may implement a control action that causes the industrial system to operate according to an operating state based on an output from a decision tree. In general, the decision tree receives process data and may output a classification (e.g., a health state of an industrial automation process, an indication of items that may need repair, an approximation of a quality of product produced by the industrial automation process, a model to be implemented by the control system) of the process data based on a type of operation for which the decision tree is trained, such as monitoring operations, diagnostic operations, anomalous process data identification operations, and the like. At least in some instances, the decision tree may output an anomalous classification (e.g., anomalous output) that does not accurately reflect the industrial automation process. In these instances, the decision tree may be retrained, which may limit or reduce the efficiency of implementing the decision tree into monitoring the industrial automation process. As such, it may be desirable to provide improved systems and methods for identifying anomalous outputs of a decision tree and modifying the decision tree in real time or near real time to increase the efficiency in which the industrial automation system operates.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a non-transitory computer-readable medium comprising computer-executable instructions that, when executed, are configured to cause a processor to perform operations that include receiving operational parameters for one or more automation devices, wherein the one or more automation devices are configured to implement control logic generated based on a decision tree. The operations also include receiving an output by the decision tree based on the operational parameters. Further, the operations include determining the output is an anomalous output based on a constraint associated with the decision tree. Further still, the operations include generating an updated decision tree based on the anomalous output. Even further, the operations includes generating updated control logic for the one or more automation devices based on the updated decision tree. Even further, the operations includes sending the updated control logic to the one or more automation devices.

In another embodiment, the present disclosure relates to a method. The method includes receiving, via a processor, a first operational parameter for one or more automation devices, wherein the one or more automation devices are configured to implement control logic generated based on a decision tree. The method also includes receiving, via the processor, an output decision by the decision tree based on the first operational parameter. Further, the method includes determining, via the processor, the output decision is an anomalous decision. Further still, the method includes generating, via the processor, an updated decision tree based on the anomalous decision. Even further, the method includes generating, via the processor, updated control logic for the one or more automation devices based on the updated decision tree. Even further, the method includes sending, via the processor, the updated control logic to the one or more automation devices.

In another embodiment, the present disclosure relates to a non-transitory computer-readable medium comprising computer-executable instructions that, when executed, are configured to cause a processor to perform operations that include receiving process input data associated with one or more automation devices over a period of time. The operations also include receiving a plurality of operational parameters implemented by the one or more automation devices in response to the process input data. Further, the operations include generating a decision tree representative of the plurality of operational parameters and corresponding process input data. Further, the operations include generating control logic for the one or more automation devices based on the decision tree, wherein the control logic is configured to cause the one or more automation devices to implement the plurality of operational parameters based on the process input data. Further, the operations include sending the control logic to the one or more automation devices; receiving process data associated with the one or more automation devices implementing the control logic. Further, the operations include providing the process data as input to the decision tree; receiving an output decision from the decision tree based on the process data; determining the output decision is an anomalous output decision. Further still, the operations include generating an updated decision tree by modifying a portion of the decision tree associated with the anomalous output decision. Even further, the operations include generating updated control logic for the one or more automation devices based on the updated decision tree. Even further, the operations include sending the updated control logic to the one or more automation devices.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
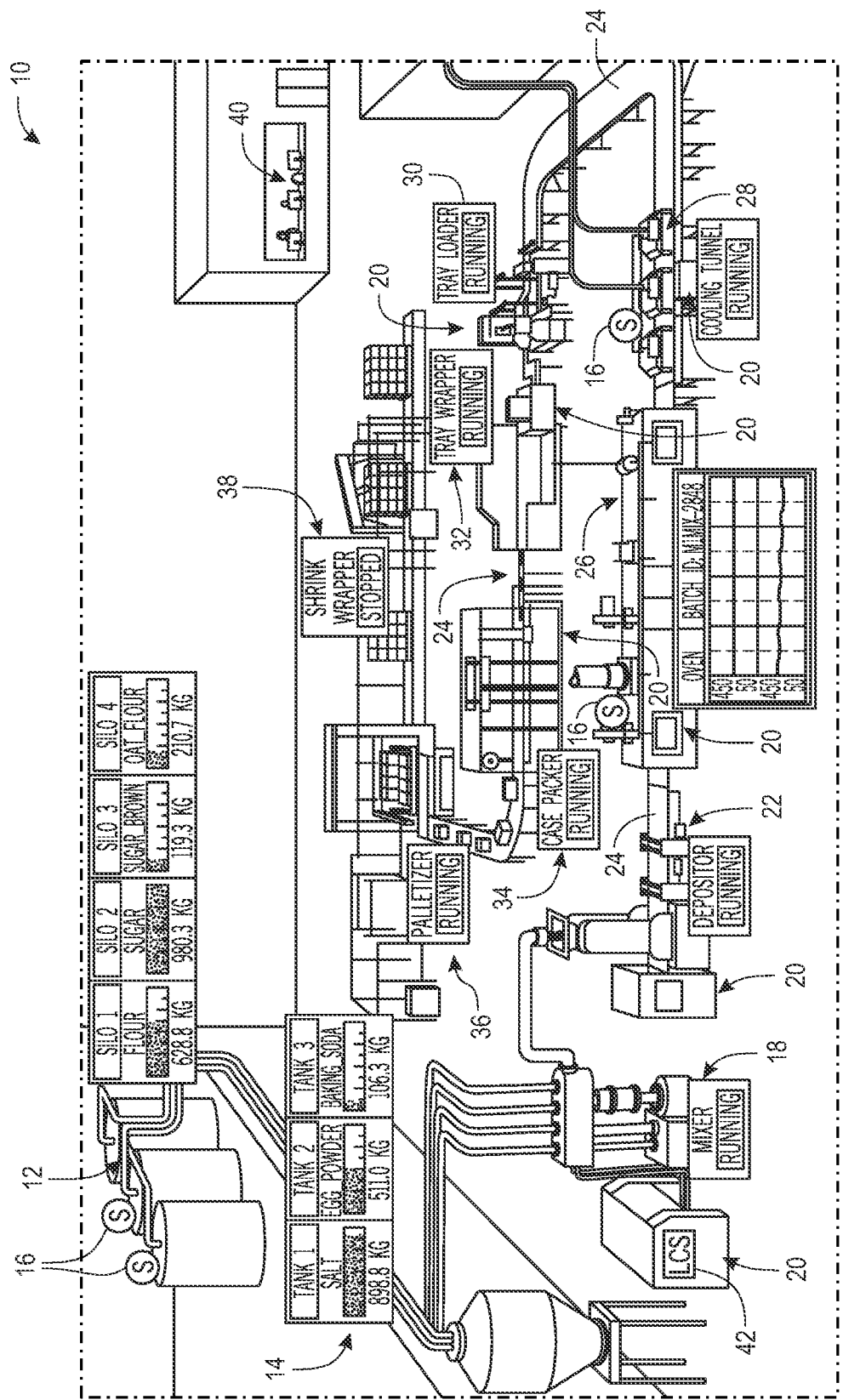
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A decision tree may provide information regarding an operation condition or current operating state of an industrial automation process that is more discernable by a user or operator as compared to certain other process models, such as neural networks, thereby enabling users to more readily monitor the industrial automation process. In general, a decision tree is a model trained using process data to provide a target or goal related to a type of operation (e.g., diagnostic operation, monitoring operation, and the like) that may be specified by a user, a control system, or otherwise. As used herein, "process data" is intended to describe data indicative of operation of an industrial automation process. For example, the process data may include inputs to the industrial automation process (e.g., process input data), outputs from the industrial automation process (e.g., process output data), disturbance variables (e.g., environmental conditions), constraints on operation, operational parameters (e.g., temperature, speed, load, position, voltage, and/or pressure) of an automation device, and the like. As another non-limiting example, the process data may include control signals indicating control actions implemented by a controller of the industrial automation process, such as a control signal that causes a conveyer to adjust (e.g., increase or decrease) an operating speed of the conveyor, a control signal that causes an actuator to actuate, a control signal that causes an oven to increase the temperature, and the like. At least in some instances, the process data may include timestamps, which may be utilized by a controller to determine, for example, control signals that occurred as a result of certain operational parameters, as discussed in more detail with respect FIG. 4.

The decision tree may include multiple nodes (e.g., decision nodes) representing a decision to be made based on the process data and branches that connect nodes to additional nodes, and ultimately to the output decision, target, or goal, such as a classification. As described above, the output for a decision tree is based on a type of operation for which the decision tree is trained. For example, a decision tree trained for monitoring operations may provide an output that classifies a condition, whether binary (e.g., a numerical indication indicating whether or not a device is healthy or unhealthy) or any set of conditions of the industrial automation process. As another non-limiting example, a decision tree trained for predictive maintenance operations may provide an output that indicates a future fault, such as an estimated time period corresponding when a device of an industrial system needs repairing. As a further example, a decision may be trained to provide an output that indicates whether a model implemented by a control system is suitable for controlling the industrial system (e.g., via control actions implemented via the control system), whether to modify the model, or whether to select a different model to control the industrial system. In any case, the output of the decision tree (e.g., a classification, a control signal) may be utilized by a control system to control operation of one or more automation devices to facilitate performing an industrial automation process. Industrial automation processes may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump (e.g., an automation device) to perform an oil extraction process. Although examples are provided with regard to specific contexts, one of ordinary skill in the art will recognize that these examples are not intended to be limiting and that the techniques described herein can be used with any suitable context.

At least in some instances, the decision tree may output an anomalous decision or classification. As referred to herein, "an anomalous classification" may refer to a classification of an operating state that deviates from a classification indicative of the actual operating state of the industrial system. Anomalous classification may result in retraining of the entire decision tree, which may be undesirable because the decision tree may not be available for making decisions, retraining of the decision may utilize resources that would be used for other operations.

Accordingly, the present disclosure is directed to systems and methods for training, implementing, and modifying a decision tree being utilized in an industrial automation system. Aspects in accordance with the present disclosure may prevent and/or minimize retraining of the model implemented by the control system and/or the decision tree, and thus improving the robustness of the decision tree and/or model used to control the industrial process. "Robustness" of a decision tree may refer to a relatively lower likelihood of the decision tree being retrained. In general, the disclosed decision tree is modified incrementally based on an identified anomalous classification output (e.g., output decision, output classification) by the decision tree. That is, a decision tree may output a classification that is determined to be an anomalous classification based on input (e.g., provided by a user) indicating that the classification does not accurately characterize an actual classification of an industrial automation process. For example, the information may include constraints, which indicate that a particular output target or goal is not associated with a combination of process data and may be specified by a user (e.g., an operator) and/or a predetermined rule stored in memory. Rather than retraining the entire decision tree, a portion (e.g., one or more nodes or branches directly connected to the anomalous classification) of the decision tree related to the anomalous classification may be modified, such as by adjusting thresholds of nodes, splitting nodes, rearranging connectivity of branches, adding additional nodes, and the like. At least in some instances, the decision tree may be taken offline or prevented from providing outputs to control the industrial automation system while the decision tree is being retrained. It should be noted that while the above discussion refers to outputs of decision trees as a "classification", the classification may be utilized by the control to determine a control action, or the decision tree may output a control action. Accordingly, by adding new paths or modifying a portion of the decision tree to the decision tree rather than retraining the decision tree the decision tree is generated and updated incrementally, as opposed to being retrained altogether. Generating a decision tree incrementally, may improve the robustness of the decision tree, may reduce the amount of processing power of the control system that manages the retraining of the decision tree, reduce the amount of time in which an updated decision tree is available for use, and the like.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
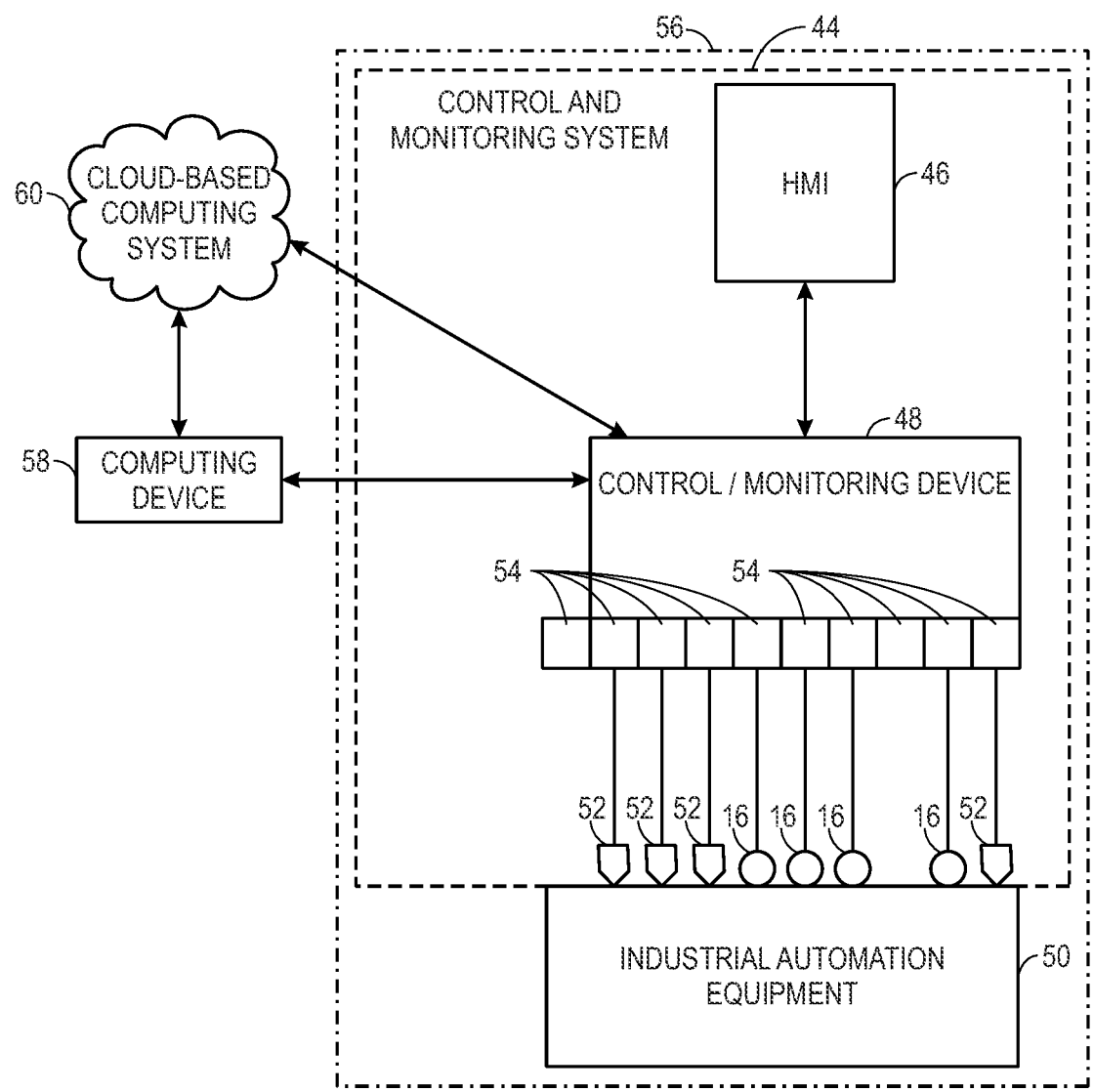
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary local control system 42 that may be employed in any suitable industrial automation system 10, in accordance with embodiments presented herein. In FIG. 2, the local control system 42 is illustrated as including a human machine interface (HMI) 46 and a control/monitoring device 48 or automation controller adapted to interface with devices that may monitor and control various types of industrial automation equipment 50. By way of example, the industrial automation equipment 50 may include the mixer 18, the depositor 22, the conveyor 24, the oven 26, other pieces of machinery described in FIG. 1, or any other suitable equipment.

It should be noted that the HMI 46 and the control/monitoring device 48, in accordance with embodiments of the present techniques, may be facilitated by the use of certain network strategies. Indeed, any suitable industry standard network or network may be employed, such as DeviceNet, to enable data transfer. Such networks permit the exchange of data in accordance with a predefined protocol and may provide power for operation of networked elements.

As discussed above, the industrial automation equipment 50 may take many forms and include devices for accomplishing many different and varied purposes. For example, the industrial automation equipment 50 may include machinery used to perform various operations in a compressor station, an oil refinery, a batch operation for making food items, a mechanized assembly line, and so forth. Accordingly, the industrial automation equipment 50 may comprise a variety of operational components, such as electric motors, valves, actuators, temperature elements, pressure sensors, or a myriad of machinery or devices used for manufacturing, processing, material handling, and other applications.

Additionally, the industrial automation equipment 50 may include various types of equipment that may be used to perform the various operations that may be part of an industrial application. For instance, the industrial automation equipment 50 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 50 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In certain embodiments, one or more properties of the industrial automation equipment 50 may be monitored and controlled by certain equipment for regulating control variables used to operate the industrial automation equipment 50. For example, the sensors 16 and actuators 52 may monitor various properties of the industrial automation equipment 50 and may provide data to the local control system 42, which may adjust operations of the industrial automation equipment 50, respectively.

In some cases, the industrial automation equipment 50 may be associated with devices used by other equipment. For instance, scanners, gauges, valves, flow meters, and the like may be disposed on industrial automation equipment 50. Here, the industrial automation equipment 50 may receive data from the associated devices and use the data to perform their respective operations more efficiently. For example, a controller (e.g., control/monitoring device 48) of a motor drive may receive data regarding a temperature of a connected motor and may adjust operations of the motor drive based on the data.

In certain embodiments, the industrial automation equipment 50 may include a communication component that enables the industrial equipment 50 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation equipment 50 to communicate via various wired or wireless communication protocols, such as Wi-Fi, mobile telecommunications technology (e.g., 2G, 3G, 4G, LTE), Bluetooth®, near-field communications technology, and the like.

The sensors 16 may be any number of devices adapted to provide information regarding process conditions. The actuators 52 may include any number of devices adapted to perform a mechanical action in response to a signal from a controller (e.g., the control/monitoring device 48). The sensors 16 and actuators 52 may be utilized to operate the industrial automation equipment 50. Indeed, they may be utilized within process loops that are monitored and controlled by the control/monitoring device 48 and/or the HMI 46. Such a process loop may be activated based on process input data (e.g., input from a sensor 16) or direct operator input received through the HMI 46. As illustrated, the sensors 16 and actuators 52 are in communication with the control/monitoring device 48. Further, the sensors 16 and actuators 52 may be assigned a particular address in the control/monitoring device 48 and receive power from the control/monitoring device 48 or attached modules.

Input/output (I/O) modules 54 may be added or removed from the control and monitoring system 44 via expansion slots, bays or other suitable mechanisms. In certain embodiments, the I/O modules 54 may be included to add functionality to the control/monitoring device 48, or to accommodate additional process features. For instance, the I/O modules 54 may communicate with new sensors 16 or actuators 52 added to monitor and control the industrial automation equipment 50. It should be noted that the I/O modules 54 may communicate directly to sensors 16 or actuators 52 through hardwired connections or may communicate through wired or wireless sensor networks, such as Hart or IOLink.

Generally, the I/O modules 54 serve as an electrical interface to the control/monitoring device 48 and may be located proximate or remote from the control/monitoring device 48, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 54 may transfer input and output signals between the control/monitoring device 48 and the industrial automation equipment 50. As illustrated, the sensors 16 and actuators 52 may communicate with the control/monitoring device 48 via one or more of the I/O modules 54 coupled to the control/monitoring device 48.

In certain embodiments, the control/monitoring system 44 (e.g., the HMI 46, the control/monitoring device 48, the sensors 16, the actuators 52, the I/O modules 54) and the industrial automation equipment 50 may make up an industrial automation application 56. The industrial automation application 56 may involve any type of industrial process or system used to manufacture, produce, process, or package various types of items. For example, the industrial applications 56 may include industries such as material handling, packaging industries, manufacturing, processing, batch processing, the example industrial automation system 10 of FIG. 1, and the like.

In certain embodiments, the control/monitoring device 48 may be communicatively coupled to a computing device 58 and a cloud-based computing system 60. In this network, input and output signals generated from the control/monitoring device 48 may be communicated between the computing device 58 and the cloud-based computing system 60. Although the control/monitoring device 48 may be capable of communicating with the computing device 58 and the cloud-based computing system 60, as mentioned above, in certain embodiments, the control/monitoring device 48 (e.g., local computing system 42) may perform certain operations and analysis without sending data to the computing device 58 or the cloud-based computing system 60.

Figure 3:
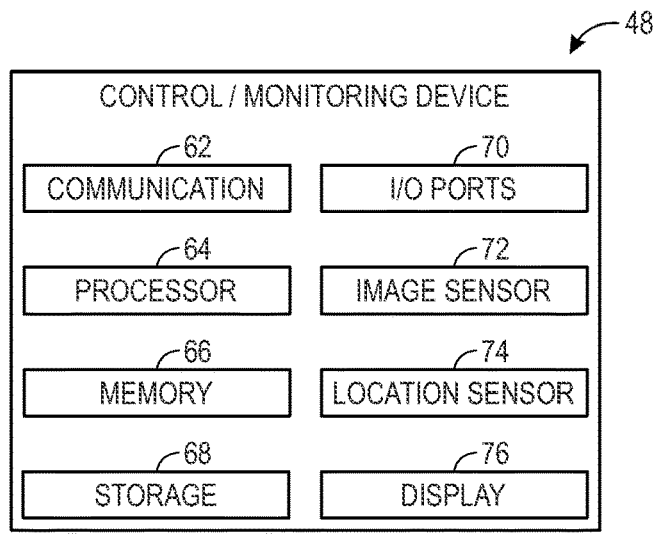
FIG. 3 illustrates example components that may be part of a control/monitoring device in a control system for the industrial automation system, in accordance with an embodiment.

In any case, FIG. 3 illustrates example components that may be part of the control/monitoring device 48, the local control system 42, or any other suitable computing device that implement embodiments presented herein. For example, the control/monitoring device 48 may include a communication component 62, a processor 64, a memory 66, a storage 68, input/output (I/O) ports 70, an image sensor 72 (e.g., a camera), a location sensor 74, a display 76, additional sensors (e.g., vibration sensors, temperature sensors), and the like. The communication component 62 may be a wireless or wired communication component that may facilitate communication between the industrial automation equipment 50, the cloud-based computing system 60, and other communication capable devices.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that enable a user to track and/or monitor operations of the industrial automation equipment 50 via a local or remote communication link. That is, the software applications may communicate with the control/monitoring device 48 and gather information associated with the industrial automation equipment 50 as determined by the control/monitoring device 48, via the sensors 16 disposed on the industrial automation equipment 50 and the like.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

In one embodiment, the memory 66 and/or storage 68 may include a software application that may be executed by the processor 64 and may be used to monitor, control, access, or view one of the industrial automation equipment 50. As such, the computing device 58 may communicatively couple to industrial automation equipment 50 or to a respective computing device of the industrial automation equipment 50 via a direct connection between the devices or via the cloud-based computing system 60. The software application may perform various functionalities, such as track statistics of the industrial automation equipment 50, store reasons for placing the industrial automation equipment 50 offline, determine reasons for placing the industrial automation equipment 50 offline, secure industrial automation equipment 50 that is offline, deny access to place an offline industrial automation equipment 50 back online until certain conditions are met, and so forth.

The I/O ports 70 may be interfaces that may couple to other peripheral components such as input devices (e.g., keyboard, mouse), sensors, input/output (I/O) modules, and the like. I/O modules may enable the computing device 58 or other control/monitoring devices 48 to communicate with the industrial automation equipment 50 or other devices in the industrial automation system via the I/O modules.

The image sensor 72 may include any image acquisition circuitry such as a digital camera capable of acquiring digital images, digital videos, or the like. The location sensor 74 may include circuitry designed to determine a physical location of the computing device 58. In one embodiment, the location sensor 74 may include a global positioning system (GPS) sensor that acquires GPS coordinates for the control/monitoring device 48.

The display 76 may depict visualizations associated with software or executable code being processed by the processor 64. In one embodiment, the display 76 may be a touch display capable of receiving inputs (e.g., parameter data for operating the industrial automation equipment 50) from a user of the control/monitoring device 48. As such, the display 76 may serve as a user interface to communicate with the industrial automation equipment 50. The display 76 may display a graphical user interface (GUI) for operating the industrial automation equipment 50, for tracking the maintenance of the industrial automation equipment 50, and the like. The display 76 may be any suitable type of display, such as a liquid crystal display (LCD), plasma display, or an organic light emitting diode (OLED) display, for example. Additionally, in one embodiment, the display 76 may be provided in conjunction with a touch-sensitive mechanism (e.g., a touch screen) that may function as part of a control interface for the industrial automation equipment 50 or for a number of pieces of industrial automation equipment in the industrial automation application 56, to control the general operations of the industrial automation application 56. In some embodiments, the operator interface may be characterized as the HMI 46, a human-interface machine, or the like implemented via the display 76.

Although the components described above have been discussed with regard to the control/monitoring device 48 and the local control system 42, it should be noted that similar components may make up other computing devices described herein. Further, it should be noted that the listed components are provided as example components and the embodiments described herein are not to be limited to the components described with reference to FIG. 3.

Referring back to FIG. 2, in operation, the industrial automation application 56 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof.

To produce the one or more outputs used to control the industrial automation equipment 50, the control/monitoring device 48 may output control signals to instruct industrial automation equipment 50 to perform a control action by implementing manipulated variable set points. For example, the control/monitoring device 48 may instruct a motor (e.g., an automation device 20) to implement a control action by actuating at a particular operating speed (e.g., a manipulated variable set point).

In some embodiments, the control/monitoring device 48 may determine the manipulated variable set points based at least in part on process data. As described above, the process data may be indicative of operation of the industrial automation device 20, the industrial automation equipment 50, the industrial automation application 56, and the like. As such, the process data may include operational parameters of the industrial automation device 20 and/or operational parameters of the industrial automation application 65. For example, the operational parameters may include any suitable type, such as temperature, flow rate, electrical power, and the like.

Thus, the control/monitoring device 48 may receive process data from one or more of the industrial automation devices 20, the sensors 16, or the like. In some embodiments, the sensor 16 may determine an operational parameter and communicate a measurement signal indicating the operational parameter to the control/monitoring device 48. For example, a temperature sensor may measure temperature of a motor (e.g., an automation device 20) and transmit a measurement signal indicating the measured temperature to the control/monitoring device 48. The control/monitoring device 48 may then analyze the process data to monitor performance of the industrial automation application 56 (e.g., determine an expected operational state) and/or perform diagnostics on the industrial automation application 56.

To facilitate controlling operation and/or performing other functions, the control/monitoring device 48 may include one or more controllers, such as one or more model predictive control (MPC) controllers, one or more proportional-integral-derivative (PID) controllers, one or more neural network controllers, one or more fuzzy logic controllers, or any combination thereof.

In some embodiments, the supervisory control system 40 may provide centralized control over operation of the industrial automation application 56. For example, the supervisory control system 40 may enable centralized communication with a user (e.g., operator). To facilitate, the supervisory control system 40 may include the display 76 to facilitate providing information to the user. For example, the display 76 may display visual representations of information, such as process data, selected features, expected operational parameters, and/or relationships there between. Additionally, the supervisory control system 40 may include similar components as the control/monitoring device 48 described above in FIG. 3.

On the other hand, the control/monitoring device 48 may provide localized control over a portion of the industrial automation application 56. For example, in the depicted embodiment of FIG. 1, the local control system 42 that may be part of the mixer 18 may include the control/monitoring device 48, which may provide control over operation of a first automation device 20 that controls the mixer 18, while a second local control system 42 may provide control over operation of a second automation device 20 that controls the operation of the depositor 22.

In some embodiments, the local control system 42 may control operation of a portion of the industrial automation application 56 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

As discussed above, the industrial automation system 10 may be controlled by one or more local control systems 42 using a decision tree. Moreover, the local control system 42 may generate the decision tree based on inferences and relationships regarding process data indicative of inputs (e.g., sensor data or data acquired by the sensors 16) and outputs (e.g., sensor data, control actions, analysis results). As described above, in some embodiments, a user may provide an input indicating that a previous output of a decision tree (e.g., a classification) is anomalous using certain constraints (e.g., an operational parameter should remain within a threshold range). Rather than retraining the entire decision tree, the local control system 42 may modify a portion of the decision tree associated with the anomalous classification, such as the one or more previous nodes linked to the output anomalous classification, an arrangement of branches, and the like as discussed in further detail with respect to FIG. 7. At least in some instances, the local control system may add an alternative control action or classification to the decision tree, such that subsequently received process data that is generally similar the process data that resulted in the anomalous classification will be directed to the alternative control action or classification. In this way, a decision tree may be modified incrementally, thereby improving the efficiency at which the decision tree and generated using process data during operation of the industrial automation system.

Figure 4:
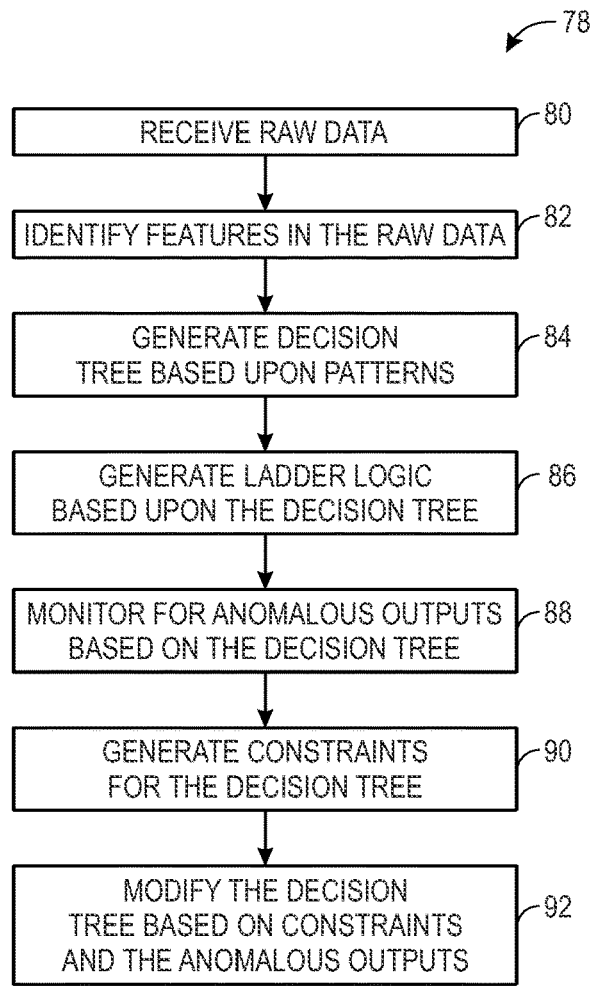
FIG. 4 illustrates a flow chart of a method for generating a decision tree that may be used to control operation of the industrial automation system, in accordance with an embodiment.

To illustrate this, FIG. 4 illustrates a flow chart of a method 78 for generating ladder logic to be implemented with a control device (the control/monitoring device 48) based on constraints for an industrial process. Although the method 78 described as being performed by the control/monitoring device 48, it should be noted that any suitable computer device capable of communicating with other components in the industrial automation system 10 may perform the disclosed method 78 including, but not limited to, the cloud-based computing system 60, the computing device 58, and the like. In general, the method 78 includes receiving process data or raw data (e.g., process data that has not undergone pre-processing) (block 80); identifying features in the raw data (block 82); generating a decision tree based on the patterns (block 84); generating ladder logic based upon the decision tree (block 86); monitoring for anomalous outputs from the decision tree based on an industrial system implementing ladder logic (block 88); generate constraints for the decision tree (block 90); and modifying the decision tree based on the anomalous outputs and constraints (block 92).

Accordingly, in some embodiments, at block 80, the control/monitoring device 48 may receive raw data associated with operations performed by the industrial automation system 10 over a period of time. In general, the received raw data may include historical data indicative of measured operational parameters of the industrial automation system 10 and control actions performed by the industrial automation system 10 that are correlated with measured operational parameters. In general, the raw data includes generally similar information as the process data; however, the raw data may be process data prior pre-processing (e.g., filtering, denoising, and the like). For example, the raw data may be indicative of operational parameters (e.g., a temperature, an operating speed, a mass, a volume, a type of material being processed, a pressure, a humidity level, a voltage, and the like) and/or actions or operations being executed by the industrial automation equipment 50, such as the mixer 18, the depositor 22, the conveyor 24, the oven 26, and the like over a period of time in which the industrial automation system 10 operates. As such, the raw data may provide a data view of various inputs of the process data (e.g., process input data) and corresponding outputs of process data (e.g., process output data) over a period of time for a variety of operational conditions and scenarios. That is, the raw data may capture the performance of various equipment 50 over time and the manner in which the operations of the equipment 50 has been adjusted in light of the presence of various operational conditions.

At block 82, the control/monitoring device 48 may identify features, patterns, or correlations within the raw data or process data. The features may include groups or clusters of certain process input data and process output data. For example, the control/monitoring device 48 may identify that the process output data indicates a first operational parameter for a first set of process input data and a second operational parameter for a second set or process input data. As such, the control/monitoring device 48 may segment or define an axis between the first set of process input data and the second set of process input data, such that data having parameters similar to the first set of process input data are associated with the first operational parameter. Similarly, the control/monitoring device 48 may associate data having parameters similar to the second set of process input data to the second operational parameter. Additionally, the control/monitoring device 48 may further segment or define axes between the received raw data thereby define further groups or clusters within the data that may be used to generate the decision tree at block 84. At least in some instances, the control/monitoring device 48 may preprocess the raw data, as described in more detail with respect to the data processing module 104 of FIG. 5.

At block 84, the control/monitoring device 48 may generate a decision tree based upon patterns or correlations between the inputs and outputs of the received raw data and/or processed received raw data. In general, to generate the decision tree, the control/monitoring device 48 may utilize historical data, streaming data (e.g., data streamed from sensors 16), process data, and the like, to build or generate the decision tree. The decision tree may include nodes (e.g., root nodes, internal nodes) and branches that connect multiple nodes and/or connect nodes to predicted process output data based on patterns or correlations of the model determined by the control/monitoring device 48, at block 82. In an embodiment where the control/monitoring device 48 segments the received raw data, the control/monitoring device 48 may generate a node for each segmented portion of the raw data. For example, a first subset of the received raw data having operational parameters that are on one side of a first axis (e.g., greater than or less than an operational parameter threshold) may be directed to a first branch extending from a first node. Further, a second subset of the received raw data having operational parameters on an opposing side of the first axis (e.g., less than or greater than the operational parameter threshold) may be directed to second branch extending from the first node. As such, subsequently received process input data having operational parameters greater that the operational parameter threshold is directed to the first branch. While one example of segmenting the received raw data is described, it should be noted that the control/monitoring device 48 may further segment the received raw data, and thus generate additional modes connected to the first node via respective branches (e.g., the first branch of the second branch).

At block 86, the control/monitoring device 48 may generate ladder logic based on the decision tree. In general, the ladder logic may include a program language (e.g., PLC code) used to develop software for implementation by controllers (e.g., the control/monitoring device 48). The ladder logic may be used to control manufacturing processes where sequential control of the process may be used. For example, and continuing with the examples provided above, the ladder logic may include suitable software operable by certain control systems or devices for sending a first signal to a mixer 18 and a second signal for controlling the operation of the oven 26 in light of the decision tree. At least in some instances, the control/monitoring device 48 may generate the ladder logic using the decision tree representative of the operation of the industrial automation system 10. The generated ladder logic may then be executed by the respective control systems in real-time to effectively manage and react to certain time-sensitive applications. At least in some instances, the control/monitoring device 48 may display the ladder logic on an electronic display (e.g., the display 76), thereby enabling a user (e.g., an operator) to monitor diagnostics associated with the execution of the ladder logic, and thus may provide reliable deployment of the ladder logic at scale.

At block 88, the control/monitoring device 48 may monitor classifications made by the respective control device implementing the ladder logic generated at block 86. That is, after the control/monitoring device 48 generates the ladder logic, the control/monitoring device 48 may implement or send the ladder logic to other control systems to control operation of the industrial automation system 10. In turn, process data related to the industrial automation system 10 may be provided to the decision tree, which outputs a decision, target, or goal, such as a classification. For example, and as discussed in more detail with respect to FIG. 6, the control/monitoring device 48 may determine whether an output classification of the decision tree is an anomalous classification based on constraints stored in the memory 66 and/or provided by user input. In general, an anomalous output may violate a constraint provided be a user and/or or stored in the memory 66 indicating an action that should not be taken, an incorrect health state, an incorrect indication of a future fault of a device, and the like.

At block 90, the control/monitoring device 48 may generate and/or receive constraints for the decision tree. In general, the control/monitoring device 48 generating constraints may include linking a rule that process data may not be linked to a particular classification for the decision tree. For example, the control/monitoring device 48 may output the classification provided by the decision tree, receive a user input indicating that the classification is an anomalous classification, and may generate a constraint that generally indicates that the anomalous classification should not result from the set of process data that resulted in the anomalous classification. The constraints may correspond to the changes made by a user or operator in response to an anomalous classification output by the decision tree. The constraints may be based on the user's or operator's historical knowledge of operation of the industrial automation system 10 or the industrial automation equipment 50. In some embodiments, the constraints may be received (e.g., via an input device) by the control/monitoring device 48, such as while the control/monitoring device 48 is implementing the ladder logic generated based on upon the decision tree.

At block 92, the control/monitoring device 48 may modify the decision tree based on constraints associated with the decision tree and the anomalous classification. In general, modifying the decision tree based on constraints and the anomalous classification may include modifying a threshold associated with a node, adding new nodes, retraining one or more nodes, generating a new node to link an input (e.g., process data) to an alternative classification (e.g., a different classification for the process data than was output by a previous, unmodified version of the decision tree), and other techniques described in more detail with respect to FIGS. 6 and 7. For example, in response to determining that a previous classification is an anomalous classification based on a constraint (e.g., a user input indicating that the classification is an anomaly), the control/monitoring device 48 modify and retrain one or more nodes or branches that are connected to the previous classification (e.g., the anomalous classification) thereby minimizing or preventing the local control system 42 from overfitting the decision tree with additional nodes or branches. As a result, if the control/monitoring device 48 identifies other process input data that is generally similar to (e.g., having a similar value, having a similar combination of operational parameters) the process input data that resulted in the previous classification, the process input data will be directed to a different classification. In general, the different classification may be a new classification determined via retraining of a portion of the decision tree or an alternative classification provided by a user.

Figure 5:
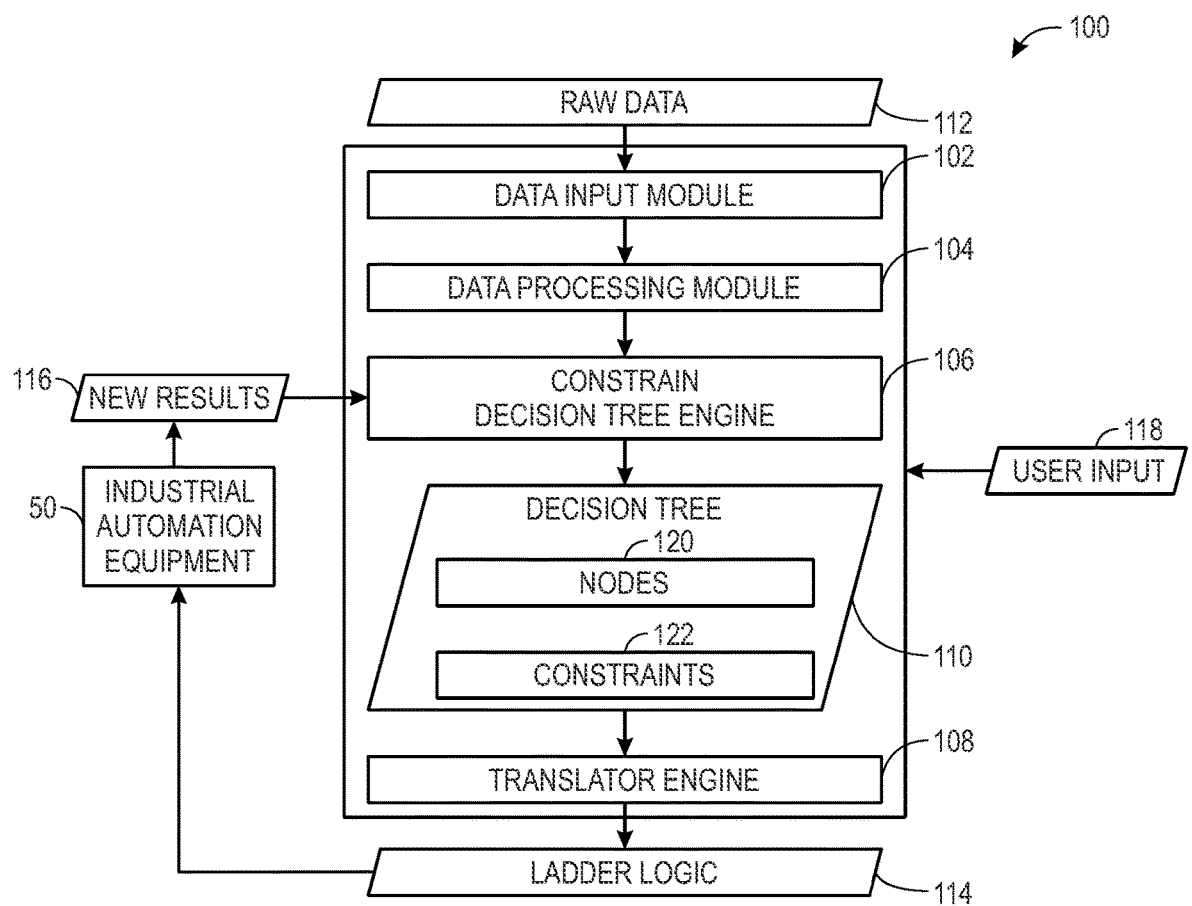
FIG. 5 is a data flow diagram representative of a process performed by the control system of FIG. 3 to implement the method of FIG. 4, in accordance with an embodiment.

In some embodiments, the control/monitoring device 48 may implement the process 78 using multiple modules. For example, FIG. 5 illustrates a block diagram 100 of the control/monitoring device 48 that may include a data input module 102, a data processing module 104, a constrained decision tree engine 106, and a translator engine 108 that may cooperate to generate a decision tree 110 using raw data 112, which includes process data inputs and process data outputs associated with the industrial automation system 10. Further, the decision tree 110 is used to generate ladder logic 114, which may be used to control the industrial automation equipment 50. The industrial automation equipment 50, operating in accordance with the ladder logic 114, may generate new results 116 (e.g., process data) that are provided as input to the constrained decision tree engine 106, which may modify the decision tree 110 based on the new results 116 and user input 118 and, in turn, generate updated ladder logic 114, as discussed in more detail below. In general, each of the data input module 102, the data processing module 104, the constrained decision tree engine 106, the translator engine may perform one or more of the blocks 80, 82, 84, 86, 88, 90, and 92 of the process 78 of FIG. 4.

As shown in the depicted embodiment, the data input module 102 receives the raw data 112. In some embodiments, the data input module 102 may receive the raw data 112 as a batch of data (e.g., from a historian, .CSV values, and the like). In some embodiments, the data input module 102 may receive the data as a stream, such as during operation of the industrial automation system 10 thereby enabling the data input module to generate the decision tree 110 in real-time.

As shown in the depicted embodiment of FIG. 5, the data input module 102 is communicatively coupled to the data processing module 104. In general, the data input module 102 may output the received raw data 112 to the data processing module 104 and the data processing module 104 may generally pre-process the received raw data 112 in a generally similar manner as described above with respect to block 80 of the process 78. For example, the data processing module 104 may label the data using a stream classification engine. As such, the labeled raw data may generally indicate different classifications within the raw data, which may improve the robustness of the decision tree 110.

In some embodiments, the data processing module 104 may preprocess the data by determining whether a magnitude or range of the received raw data corresponds to expected data range or predetermined data bounds, which may indicate whether the data is normal (e.g., when the received raw data is within the expected data range), and thus may be used for training a decision tree.

In some embodiments, preprocessing the received raw data may include the data processing module 104 modifying a format of the raw data such that the received raw data used to generate the decision tree at block 84 is generally aligned. That is, the data processing module 104 may interpolate, extrapolate, remove, or otherwise modify the received raw data such that a resolution, a range, received raw data, or a step size of the received raw data is generally similar for multiple data sets of received raw data. For example, in an embodiment where raw material is deposited by a depositor 22 onto a moving conveyor 24 where a mass of the raw material moves over a time interval from the beginning of the conveyor 24 to the end of the conveyor 24, the data processing module 104 may modify the data such that a timestamps associated with the material being deposited on the depositor 22 is before the time interval associated with the raw material moving along the conveyor 24. It should be noted that the timestamps may be used for determining relationships between the equipment of the industrial automation system 10 (e.g., which equipment are operating cooperatively and which equipment are operating independently of other equipment).

In some embodiments, preprocessing the received raw data may include the data processing module 104 generating new features out of the received raw data. In general, generating new features out of the received raw data may include removing or modifying the received raw data. For example, the data processing module 104 may remove redundant data if the control/monitoring device 48 determines that at least two process data are the same. As another nonlimiting example, the data processing module 104 may de-noise the received raw data to generate denoised raw data, such as by producing a statistical representation of the data (e.g. mean and standard deviation over a defined window associated with the received raw data).

In some embodiments preprocessing the received raw data 112 may include the data processing module 104 labeling the received raw data 112. For example, the data processing module 104 may use a stream clustering engine to create labels for the incoming data, or other clustering and labeling techniques as would be appreciated by one of ordinary skill in the part. That is, the data processing module 104 may use a stream classification engine to label or classify the incoming received raw data based on labels provided (e.g. by user). For example, the data processing module 104 may identify clusters within the received raw data and use statistics of identified clusters to filter the received raw data before sending the received raw data to be used to generate the decision tree. In any case, the labels generated by the data processing module 104 may be used by the constrained decision tree engine 106 to generate nodes that are specific to the labels, which may correspond to generally similar process data inputs and process data outputs or a similar raw material, which may improve the robustness of the decision tree.

Turning back to FIG. 5, the data processing module 104 is communicatively coupled to the constrained decision tree engine 106. In general, the data processing module 104 may output the pre-processed data (e.g., the raw data 112 pre-processed by the data processing module 104) to the constrained decision tree engine 106, and the constrained decision tree engine 106 may generate a decision tree 110 in a generally similar manner as described above with respect to block 84 of the process 78, such by requesting input from an operator.

In the depicted embodiment, the decision tree 110 includes nodes 120 and constraints 122. In general, the nodes 120 and the constraints 122 may be generated during generation of the decision tree 110 and/or after the decision tree 110 is generated and used to control the industrial automation system 10. For example, the constraints may be defined by a user after the decision tree 110 is generated.

In an embodiment where the pre-processed data is labeled, the data processing module 104 may generate nodes 120 and branches for each of the classifications indicate by the labels. For example, the labels may indicate a mass and size of raw material deposited by the depositor 22. That is, a first mass range and a first size range may be labeled with a first label and a second mass range and a second size range may be labeled with a second label. As such, the constrained decision tree engine 106 may generate a first node with two branches, where the decision associated with the first node is whether received data (e.g., process input data, raw data) includes a mass and/or size within the first mass range or the second mass range and/or the first size range or the second size range. If the received data includes a mass within the first mass range and/or the first size range, the received data may be directed to (e.g., using the decision tree 110) a first set of nodes and branches associated with decisions to be made for data having the first label. Similarly, if the received data includes a mass and/or size range within the second mass range and/or the second size range, the received data may be directed to a second set of nodes and branches associated with decision to be made for data having the second label. By separating the nodes may for different classifications, the robustness of the decision tree 110 may be improved.

In some embodiments, the constrained decision tree engine 106 may generate the constraints 122 based on user input 118. For example, during an initial setup of the decision tree 110, the control/monitoring device 48 may output a notification to a user device requesting that the user provide constraints for the decision tree 110. As such, upon receiving the constraints 122 based on the user input 118, the constrained decision tree engine 106 will use the constraints 122 to determine whether or not to generate nodes or branches as discussed herein.

In some embodiments, the constrained decision tree engine 106 may determine a splitting criterion based on the received raw data. For example, the constrained decision tree engine 106 may identify a cluster or a group within the received raw data or a subset cluster within a previously identified cluster. For example, the constrained decision tree engine 106 may determine a similarity between two potential distributions within the received raw data, such as by calculating a Hellinger distance. As such, if the Hellinger distance is above a threshold (e.g., a predefined threshold), the constrained decision tree engine 106 may determine to split the two potential distributions and generate a node linked to a decision for determining whether data is associated with either of the two potential distributions. In this way, the constrained decision tree engine 106 may recognize an imbalance in incoming data (e.g., training data) data and may select a splitting criterion that reduces the sensitivity to unbalanced data.

In any case, the constrained decision tree engine 106 may use constraints (e.g., user defined constraints) to determine whether to generate a new node (s), modify node(s), or modify a connectivity of branches connecting nodes. That is, during generation of the decision tree or after an initial decision tree is generated, the constrained decision tree engine 106 may determine whether user defined constraints with regard to a previous splitting criterion of a node to determine whether a new node would more efficiently represent the desired process. As described in more detail with respect to FIG. 6, the decision tree 110 may be modified or retrained incrementally after an initial training. That is, after the decision tree 110 is trained using process data, such as historical process data or streamed process data, the decision tree 110 may receive process data from an operating industrial automation system 10 and output targets or goals, such as classification. If control/monitoring device 48 determines that an output classification is an anomalous classification, the constrained decision tree engine 106 may modify or retrain a portion of the decision tree 110 associated with the anomalous classification.

In some embodiments, the constrained decision tree engine 106 may translate a stored operation rule into a node in the decision tree. This ability enables hybrid learning where domain expert's knowhow and rules extracted from empirical data are optimally integrated. At least in some instances, the constrained decision tree engine 106 may output a notification or alert to a user (e.g., an operator or domain expert) via the user's computing device that indicates that a node encapsulates a validated operation rule and requests that the user confirm whether the node should be preserved during training, such as incremental training. For example, at least in some instances, a user may desire that certain nodes are preserved or not modified during training of the decision tree. In any case, the notification may include one or more selectable features (e.g., buttons) displayed via the user's computing device that the user may select to validate or confirm that the node should preserved during incremental training In an embodiment where the decision tree includes one or more nodes that are validated, as described above, the constrained decision tree engine 106 may perform a consistency check based on subsequently received raw data against the one or more nodes that are designated as validated and report any inconsistency (e.g. for closer look by expert).

In some embodiments, after or during training of the decision tree, the control/monitoring device 48 may output a notification that includes training results that may be review by a user. For example, the control/monitoring device 48 may generate the notification in human readable format (e.g. a JSON file). In this way, in an embodiment where control/monitoring device 48 is being implemented as part of an industrial automation system 10 that includes an operation technology (OT)/informational technology (IT) infrastructure, the control/monitoring device 48 may be integrated with the OT/IT infrastructure.

As shown in the depicted embodiment, the constrained decision tree engine 106 is communicatively coupled to the translator engine 108. In general, the constrained decision tree engine 106 may output the decision tree 110 to the translator engine 108, and the translator engine 108 may generally generate ladder logic 114 in a generally similar manner as described above with respect to block 84 of the process 78. For example, the translator engine 108 may generate a PLC code to implement the decision tree 110 for control of the industrial automation process. At least in some instances, the translator engine 108 may generate a ladder logic viewable with a program that may enable the user to interact with, modify, and monitor execution of the decision tree 110. At least in some instances, the ladder logic or PLC code may allow for feedback (e.g. from a domain expert, or from a KPI that is properly set up to measure the effectiveness of actions driven by the decision tree) to automatically modify or tune the trustworthiness of the recommended actions (e.g., the predicted process output data) by the decision tree in closed loop. As such, the control/monitoring device 48 that generates the ladder logic may receive inputs 111 from a user to modify certain ladder logic components. In addition, the control/monitoring device 48 may receive inputs 111 from a user to modify certain aspects of the decision tree.

At least in some instances, the control/monitoring device 48, the data input module 102, the data processing module 104, the constrained decision tree engine 106, and the translator engine 108) may modify the decision tree 110 after the decision tree 110 is implemented to control the industrial automation system 10. As shown, the translator engine 108 outputs the ladder logic to the industrial automation equipment 50. In general, the industrial automation equipment 50 (e.g., a process of the industrial automation equipment 50) may implement the ladder logic 114 to generate control signals and/or perform actions to control the operation of the industrial automation system 10.

Accordingly, the industrial automation equipment 50 operating in accordance with the ladder logic 114, may generate new results 116. In general, the new results 116 may include measured process data associated with the industrial automation system. As such, the new result 116 are provided to the decision tree 110, which may output a classification as described herein. If there is an indication (e.g., user input 118 received by the control/monitoring device 48) that the classification associated with the new results 116 is an anomalous classification, a constraint 122 may be generated and a portion of the decision tree 110 may be retrained or modified. In this way, the decision tree 110 may receive feedback (e.g., via the new results 116) that enable the decision tree 110 to include decisions for a specific implementation.

In general, the control/monitoring device 48 (e.g., including the data input module 102, the data processing module 104, the constrained decision tree engine 106, and the translator engine 108) may deployed in various techniques, such as remotely or physically located near the industrial automation system 10. For example, the control/monitoring device 48 may be deployed at the edge of the operation of the industrial automation system 10, such as on a unit operation where sensory data is captured). At least in some instances, the control/monitoring device 48 may be deployed on a compute surface that aggregates measurements from several sensors (either at the edge or remote). As another non-limiting example, the control/monitoring device 48 may be deployed on a server at the plant level and receive sensor data from multiple types of equipment operating at the plant. As another non-limiting example, the control/monitoring device 48 may be deployed as a container (for example) that is identically deployed on all platforms. Moreover, the control/monitoring device 48 may be deployed at the cloud level when appropriate. In any case, various data communication protocols may be used to facilitate communication between the control/monitoring device 48 and the industrial automation system 10 depending on the application (wireless, wired).

In some embodiments, the decision tree may be stored on the memory 66 of the control/monitoring device 48. In some embodiments, the decision tree may be deployed at the edge, on a server, or in a cloud (e.g., cloud-based computing system 60). In any case, the user input 118, such as a constraints, may be received via a PLC program in a controller or via an interface on an HMI or web application. Additionally, the modified decision tree (e.g., modified based on the user input 118) may be stored or delegated to a server, a cloud resource, or an edge device. For example, the modified decision tree may be downloadable to the edge device or an industrial automation system 10.

As discussed herein, the control/monitoring device 48 may determine whether to modify the decision tree 110, such as by retraining a portion of the decision tree 110 adding a new node using constraints 122 (e.g., based on user input 118 indicating that a previous classification is an anomalous classification). That is, instead of modifying or retraining the entire decision tree, it may be desirable to modify the paths or nodes along one or more branches that connect to the previous classification that was indicated as being anomalous. It is recognized that generating modify the paths or nodes along one or more branches that connect to the previous classification or generating a new separate path may improve the robustness of the decision tree as compared to retraining the decision tree.

Figure 6:
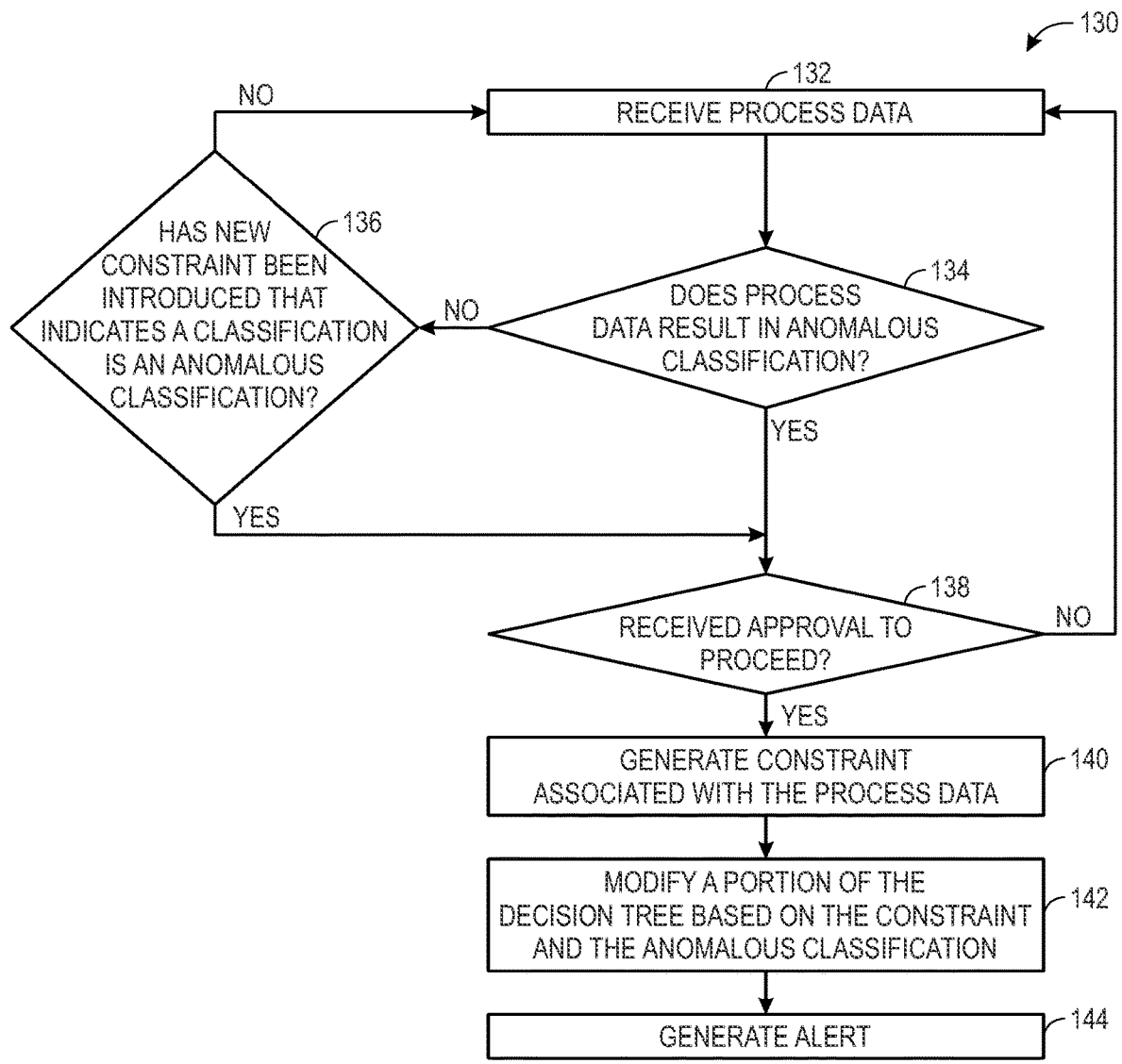
FIG. 6 illustrates a flow chart of a method for modifying a decision tree based on anomalous process data and updated constraints provided to the decision tree, in accordance with an embodiment.

To illustrate this, FIG. 6 illustrates a flow chart of a method 130 for incrementally modifying or retraining a decision tree. Although the method 130 described as being performed by the control/monitoring device 48, it should be noted that any suitable computer device capable of communicating with other components in the industrial automation system 10 may perform the disclosed method 130 including, but not limited to, the cloud-based computing system 60, the computing device 58, and the like.

With this in mind, and referring now to FIG. 6, at block 132, the control/monitoring device 48 may receive process data (e.g., new results 116). In general, the process data may include measured operational parameters associated with operations performed by the industrial automation system 10 that is operating in accordance with a decision tree (e.g., the decision tree 110).

At block 134, the control/monitoring device 48 may determine whether the process data results in an anomalous classification. In general, the control/monitoring device 48 may provide the process data to a decision tree 110 (e.g., a previously trained decision tree), output a classification (e.g., an output goal or target), and subsequently determine whether the classification (e.g., associated with the process data) is an anomalous classification. In some embodiments, to determine whether the classification is an anomalous classification, the control/monitoring device 48 may compare the anomalous classification to constraint 122 stored in a cloud storage or otherwise accessible storage location (e.g., memory 66). At block 136, the control/monitoring device 48 may determine whether a new constraint has been introduced. For example, the control/monitoring device 48 may determine whether the classification is anomalous by generating a notification on a computing device and determining whether any user input is received associated with a new constraint that indicates the classification is an anomalous classification. For example, the notification may indicate the classification and provide a summary of the process data. As such, a user may provide an input indicating whether the classification is an anomalous classification. For example, the control/monitoring device 48 may determine whether a new constraint was provided as an input (e.g., input 118 shown in FIG. 5) within a predetermined time period. If the control/monitoring device 48 determines that a new constraint has not been provided, the process 130 may return to block 132 until a subsequent proceed data is received.

If the classification is an anomalous classification, the process 130 may proceed to block 138 to send a notification to a user to determine whether there is an indication of approval to proceed with retraining the decision tree. In general, the control/monitoring device 48 may output a notification (e.g., on an electronic display of a user device) that indicates that the process data has violated a constraint and the decision tree may need retraining In some embodiments, the notification may a magnitude of retraining for the decision tree, such as a number of nodes connected to the anomalous classification, an estimated amount of time for retraining, and the like. Additionally, the notification may include selectable features that enable a user to vary the amount of retraining (e.g., a maximum number of nodes to change, a number of levels within the decision tree to change as discussed in more detail with respect to FIG. 7) and/or provide an alternative classification to link to the process data such that if the decision tree 110 receives similar process data, the decision tree 110 will output the alternative classification. If the control/monitoring device 48 does not receive approval to proceed with retraining the decision tree 110, the control/monitoring device 48 may return to block 132 until a subsequent proceed data is received.

However, if the control/monitoring device 48 does receive approval to proceed with retraining, the control/monitoring device 48 may create a constraint associated with the process data, at block 140. In general, creating or generating a constraint may be a rule or relationship indicating that process data of certain values should result in a particular classification.

After creating the constraint, the process 130 may proceed to block 142 to modify a portion of the decision tree 110. In general, block 142 may include determining a portion of the decision tree 110 to modify based on the anomalous classification, user input received at block 140, and the like, and adding one or more new nodes to the portion, retraining the portion using the constraint, modifying a connection of one or more branches, modifying a threshold associated with a decision of a node, and the like. For example, the control/monitoring device 48 may receive user input indicating that one or more nodes directly linked to the anomalous output be retrained.

In some embodiments, to modify the decision tree 110, the control system may generate a new path. For example, the new path may be separate from one or more nodes of the decision tree 110. At least in some instances, the new path may prevent the decision tree 110 from splitting modes or attempting to fit the process data to the decision tree 110. In this way, generating the new path that links the new input data to the alternative control action may improve the robustness of the decision tree 110. At block 144, the local control system 42 may generate an alert that indicates that the decision tree 110 was modified at block 142 and/or whether a constraint was created at block 140.

Figure 7:
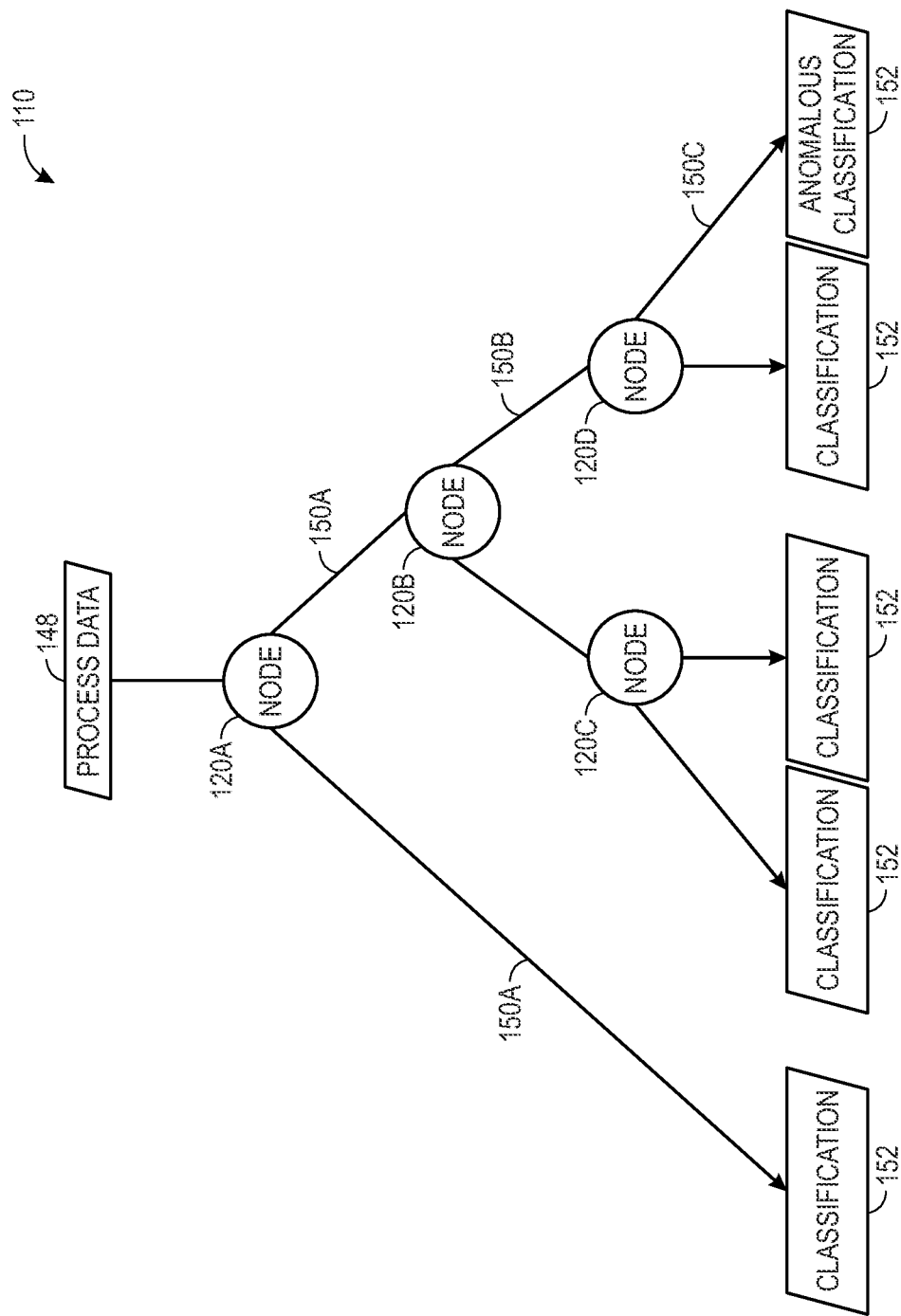
FIG. 7 illustrates a decision tree that links process data to a classification, in accordance with an embodiment.

As discussed above, the control/monitoring device 48 may modify or retrain a portion of a decision tree 110 rather than retraining a decision tree. To illustrate portions associated with anomalous classifications, FIG. 7 shows a decision tree 110 in accordance with the present embodiments. In general, the depicted embodiment of the decision tree 110 receives process data 148 (e.g., new results 118) that is provided to one or more nodes 120a, 120b, 120c, and 120d (e.g., connected via branches 150) of the decision tree 110, which ultimately outputs a classification 152. As discussed herein, the output of the decision tree 110 is generally a target or goal of an operation for which the decision tree 110 is trained. As such, it should be understood that the output of the decision tree 110 is not limited to classifications. For example, in some embodiments, the output of the decision tree may include a control signal, a model to be implemented by a controller, an indication of a future fault that may occur in the industrial automation system 10, and the like.

As shown in the illustrated embodiment, the decision tree 110 includes an anomalous classification 154. In general, the anomalous classification 154 is a classification that was previously output by the decision tree 110 and determined to be anomalous based on a user input and/or constraint indicating. Accordingly, to modify the decision tree 110 based on the anomalous classification, the control/monitoring device 48 may incrementally adjust or modify the decision tree, such as by retraining a portion of the decision tree 110 associated with the anomalous classification. In general, the portion of the decision tree 110 associated with the anomalous classification includes nodes 120 connected along branches that connect the process data 148 to the anomalous classification. For example, in some embodiments, the nodes 120a, 120b, and 120c and branches 150a, 150b, and 150c are generally along a path connecting the process data 148 to the anomalous classification 154. As such, at least a portion of the nodes 120a, 120b, and 120c and/or branches 150a, 150b, and 150c may be modified. In some embodiments, the portion may correspond to one or more different levels of nodes. For example, a first level of nodes corresponds to one or more nodes that are directly connected to the anomalous classification 154, such as node 120d. A second level of nodes may correspond to one or more ones having an intervening node between the process data 148 and the anomalous classification 154, such as node 120b. It should be appreciated that third or fourth levels of nodes may also be modified. Furthermore, any combination of these nodes may be modified. For example, the control/monitoring device 48 may receive a user input (e.g., as generally described with respect to decision block 138 of FIG. 6) that indicates how many levels of nodes should be modified, or if a specific node should be modified. It should be noted that, if the portion includes a validated node, the validated node may not be retrained, unless otherwise specified via a user input.

Accordingly, the present disclosure relates to incrementally modifying or retraining a decision tree 110 based on constraints and an anomalous output of a decision tree (e.g., targets, goals, classifications). In general, a portion of the decision tree 110 associated with the anomalous output is modified or retrained, rather than retraining the entire decision tree. In this way, retraining of the decision tree may utilize less resources, and thus the decision tree may be efficiently implemented and modified into an industrial automation system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. A non-transitory computer-readable medium comprising computer-executable instructions that, when executed, are configured to cause a processing system to perform operations comprising:
receiving process input data associated with one or more automation devices;
determining a plurality of operating conditions corresponding to the one or more automation devices based on the process input data;
clustering the process input data based on the plurality of operating conditions;
receiving a decision tree representative of the plurality of operating conditions and corresponding process input data;
determining a splitting criterion for one or more nodes of the decision tree based on the clustered process input data, wherein the splitting criterion is configured to link the process input data to at least two operating conditions of the plurality of operating conditions based on the decision tree;
generating control logic for the one or more automation devices based on the decision tree and the splitting criterion, wherein the control logic is configured to cause the one or more automation devices to implement operational adjustments associated with the plurality of operating conditions; and
sending the control logic to the one or more automation devices, wherein the control logic causes the one or more automation devices to adjust one or more operations of the one or more automation devices based on the control logic such that an operation parameter of the one or more automation devices is within a threshold range.

2. The non-transitory computer-readable medium of claim 1, wherein the computer-executable instructions that, when executed, are configured to cause the processing system to determine the splitting criterion for the one or more nodes of the decision tree based on the clustered process input data comprise:
determining a constraint corresponding to the one or more automation devices; and
determining the splitting criterion based on the constraint.

3. The non-transitory computer-readable medium of claim 2, wherein the constraint indicates the threshold range.

4. The non-transitory computer-readable medium of claim 2, wherein the clustered process input data is indicative of a subset of the process input data being linked to a first operating condition, and wherein the constraint corresponds to a link between the subset of the process input data and a second operating condition.

5. The non-transitory computer-readable medium of claim 1, wherein the splitting criterion comprises a Hellinger distance.

6. The non-transitory computer-readable medium of claim 1, wherein the control logic comprises ladder logic.

7. The non-transitory computer-readable medium of claim 1, wherein the splitting criterion is configured to minimize an unbalance in the process input data for the one or more nodes of the decision tree based on the clustered process input data.

8. The non-transitory computer-readable medium of claim 1, wherein the computer-executable instructions that, when executed, are configured to cause the processing system to cluster the process input data comprise utilizing a stream clustering engine to create one or more labels for the process input data.

9. A method, comprising:
receiving, via a processing system, process input data associated with one or more automation devices;
determining, via the processing system, a plurality of operating conditions corresponding to the one or more automation devices based on the process input data;
clustering, via the processing system, the process input data based on the plurality of operating conditions;
receiving, via the processing system, a decision tree representative of the plurality of operating conditions and corresponding process input data;

determining, via the processing system, a splitting criterion for one or more nodes of the decision tree based on the clustered process input data, wherein the splitting criterion is configured to link the process input data to at least two operating conditions of the plurality of operating conditions based on the decision tree;

generating, via the processing system, control logic for the one or more automation devices based on the decision tree and the splitting criterion, wherein the control logic is configured to cause the one or more automation devices to implement operational adjustments associated with the plurality of operating conditions; and sending, via the processing system, the control logic to the one or more automation devices, wherein the control logic causes the one or more automation devices to adjust one or more operations of the one or more automation devices based on the control logic such that an operation parameter of the one or more automation devices is within a threshold range.

10. The method of claim 9, comprising:

receiving a constraint linking a subset of the process input data to a first operating condition, wherein the decision tree is configured to link the subset of the process input data to a second operating condition; and generating an updated decision tree based on the constraint.

11. The method of claim 10, wherein generating the updated decision tree comprises generating a new path within the decision tree that links the subset of the process input data to the second operating condition.

12. The method of claim 10, wherein generating the updated decision tree comprises updating the splitting criterion based on the constraint.

13. The method of claim 10, comprising generating the updated decision tree by:

determining a portion of the decision tree linking the subset of the process input data to the first operating condition; and updating one or more nodes associated with the portion.

14. The method of claim 9, wherein the operating condition indicates a future fault that may occur for the one or more automation devices.

15. The method of claim 9, wherein clustering the process input data comprises utilizing a stream clustering engine to create labels for the process input data.

16. A non-transitory computer-readable medium comprising computer-executable instructions that, when executed, are configured to cause a processor to perform operations comprising:

receiving process input data associated with one or more automation devices;

determining a plurality of operating conditions corresponding to the one or more automation devices based on the process input data;

clustering the process input data based on the plurality of operating conditions;

receiving a decision tree representative of the plurality of operating conditions and corresponding process input data;

determining a splitting criterion for one or more nodes of the decision tree based on the clustered process input data, wherein the splitting criterion is configured to link the process input data to at least two operating conditions of the plurality of operating conditions based on the decision tree;

generating control logic for the one or more automation devices based on the decision tree and the splitting criterion, wherein the control logic is configured to cause the one or more automation devices to implement operational adjustments associated with the plurality of operating conditions; and sending the control logic to the one or more automation devices, wherein the control logic causes the one or more automation devices to adjust one or more operations of the one or more automation devices based on the control logic such that an operation parameter of the one or more automation devices is within a threshold range.

17. The non-transitory computer-readable medium of claim 16, wherein the computer-executable instructions that, when executed, are configured to cause the processor to:

receive a constraint linking a subset of the process input data to a first operating condition, wherein the decision tree is configured to link the subset of the process input data to a second operating condition; and generate an updated decision tree based on the constraint.

18. The non-transitory computer-readable medium of claim 17, wherein the computer-executable instructions that, when executed, are configured to cause the processor to generate the updated decision tree comprises updating the splitting criterion based on the constraint.

19. The non-transitory computer-readable medium of claim 16, wherein the control logic comprises ladder logic.

20. The non-transitory computer-readable medium of claim 16, wherein the computer-executable instructions that, when executed, are configured to cause the processor to determine the splitting criterion for the one or more nodes of the decision tree based on the clustered process input data comprise:

determining a constraint corresponding to the one or more automation devices; and determining the splitting criterion based on the constraint.

* * * * *